United States Patent
Bommaiah et al.

(10) Patent No.: US 6,708,213 B1
(45) Date of Patent: Mar. 16, 2004

(54) METHOD FOR STREAMING MULTIMEDIA INFORMATION OVER PUBLIC NETWORKS

(75) Inventors: Ethendranath N. Bommaiah, Old Bridge, NJ (US); Katherine H. Guo, Eatontown, NJ (US); Sanjoy Paul, Marlboro, NJ (US); Markus A. Hofmann, Tinton Falls, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/537,270

(22) Filed: Mar. 29, 2000

Related U.S. Application Data

(60) Provisional application No. 60/169,086, filed on Dec. 6, 1999.

(51) Int. Cl.7 .............................................. G06F 15/173
(52) U.S. Cl. ...................... 709/226; 709/203; 709/225; 709/231; 709/104; 370/401; 710/56
(58) Field of Search ................................. 709/200–203, 709/223–226, 231–233, 236, 238, 246, 102–104; 710/56; 370/400–401, 468

(56) References Cited

U.S. PATENT DOCUMENTS

| | | | | |
|---|---|---|---|---|
| 5,671,225 A | * | 9/1997 | Hooper et al. | 370/468 |
| 6,377,972 B1 | * | 4/2002 | Guo et al. | 709/201 |
| 6,385,693 B1 | | 5/2002 | Gerszberg et al. | 711/118 |
| 6,405,256 B1 | | 6/2002 | Lin et al. | 709/231 |
| 6,438,630 B1 | * | 8/2002 | DeMoney | 710/56 |
| 6,460,082 B1 | * | 10/2002 | Lumelsky et al. | 709/226 |
| 6,466,978 B1 | * | 10/2002 | Mukherjee et al. | 709/225 |
| 6,499,060 B1 | * | 12/2002 | Wang et al. | 709/231 |
| 6,587,480 B1 | * | 7/2003 | Higgins et al. | 370/401 |

OTHER PUBLICATIONS

Reza Rejaie, et al., "Proxy Caching Mechanism for Multimedia Playback Streams in the Internet," AT&T Canter for Internet Research at ICSI, Berkeley, CA 94704, Apr. 16, 1999.

* cited by examiner

*Primary Examiner*—Bharat Barot

(57) ABSTRACT

A method and apparatus for enhancing existing caching systems to better support streaming media over the Internet and other public network system are disclosed herein. By using helpers inside the network, which operate as caching and streaming agents, existing caching techniques are enhanced to better support streaming media over the Internet. The helpers serve to implement several methods specifically designed to support streaming media, including proxy caching, client request aggregation which describes the use of memory and disk resources at the helpers, and data transfer rate control to reduce start-up latency.

The method and apparatus advantageously reduces server and network loads by employing the above methods to overcome arrival time and range heterogeneity in client requests thereby improving the quality perceived by end users.

17 Claims, 9 Drawing Sheets

METHOD FOR STREAMING MULTIMEDIA INFORMATION OVER PUBLIC NETWORKS

This application claims priority to U.S. Provisional Ser. No. 60/169,086 filed on Dec. 6, 1999; the contents of which are incorporated herein by reference.

BACKGROUND OF THE INVENTION

1. Field of the Invention

The present invention relates to network systems, and particularly to public network systems, such as the Internet. More particularly, this invention relates to methods which improve the caching of streaming multimedia data (e.g., audio and video data) from a content provider over a network to a client's computer.

2. Description of the Related Art

Computer networks such as the Internet are increasingly being used to transmit multimedia data (e.g., audio, video). In the network-based context, one simple model of producing the information involves the client requesting the downloading of the multimedia data. Once downloaded, the client may then consume, or present, the information. This model is relatively easy to implement, however, it is non-optimal in that the client is required to wait for the downloading to complete before the presentation can begin. This delay can be considerable.

A more sophisticated model of producing information involves a content server at one network site "streaming" the multimedia information over the network to a client at another site. The client begins to present the information as it arrives (i.e., just-in-time rendering), rather than waiting for the entire data set to arrive before beginning presentation. At the client computer, received data is buffered into a cache memory and continuously processed as soon as, or soon after, being received by the client. The advantage of streaming is that the client computer does not have to wait until all data is downloaded from the server before some of the data is processed and the multimedia output is created.

An example of multimedia data streaming is found in the Real player that is available over the Internet at Universal Resource Locator ("URL") http://www.real.com. The Real player continuously sends audio data over the Internet from a server computer to the client computers. The audio data is buffered and processed by the client computers while the data is being sent. The client computers process the data by creating ari audio output from the audio data.

Applications such as the Real player have conditioned computer network users to expect instantaneous streaming data on demand. The Internet, however, is often unable to deliver streaming data. This inability is most pronounced for video data. The inability to deliver streaming data on demand is due in part to the fact that live and on-demand streaming multimedia objects are generally delivered over the Internet and other data networks via unicast connections. This architecture has many shortcomings, both from the content provider's point of view and the user or recipient's point of view. From the content provider's point of view, one is faced with a server load that increases linearly with the number of clients. That is, each additional client requesting streaming multimedia (SM) data imposes an additional burden upon the content provider to meet the increased demand. From the Internet Service Provider's (ISP's) point of view, streaming multimedia under a unicast architecture poses network congestion problems. From the client's point of view, there is often long delays between the time video content is requested by a client and the time when the video content actually begins playing (i.e., high start-up latency). In addition to the high start-up latency there also exists unpredictable playback quality due to network congestion.

Web caching has been extensively implemented on the Internet to reduce network load (i.e., bandwidth consumption), server load, and high start-up latency. The utilization of Web caching on the Internet has been extensively studied. For a more detailed discussion of Web caching, see T. Bernesrs-Lee, A. Lutonen, and H. F. Nielsen Meyr: http://www.w3.org/Daemon/Status.html, 1996; and C. M. Bowman, et al., Harvest: "A scaleable, customizable discovery and access system," Technical Report CU-CS-732-94, Dept. of Computer Science, University of Colorado, Boulder, Colo., USA, 1994, the contents of which are incorporated by reference herein. See also, D. Wessels, "ICP and the squid cache," National Laboratory for Applied Network Research, 1999, http://ircache.nlanr.net/Squid; the contents of which are incorporated by reference herein. However, current caching systems, like those described above, are restricted to support static web objects such as HTML documents or images. Static web objects are typically small and as such are always cached in their entirety. Current caching methods, therefore, do not adequately support streaming multimedia data (i.e., web objects) such as video and audio clips. Streaming multimedia data like video objects, for example, are usually too large to be cached in their entirety. A single, two hour long MPEG movie, for example, requires about 1.4 Gbytes of disk space. Given a fixed investment in disk space, only a few streams could be stored at a cache, thus, decreasing the hit probability and the efficiency of the caching system. A natural solution would be to break video objects into smaller pieces for the purpose of caching. This solution is deficient, however, in that existing caching systems will treat different chunks from the same video object independently, while it might be desirable to consider the logical relationship among the various pieces.

SM objects can be generally differentiated from static web objects in that SM objects consist of multimedia data whose transmission has temporal characteristics such that the transmission rate is explicitly regulated or else the data becomes useless. In addition, the size of an SM object typically is at least an order of magnitude or two larger than that of a static web object, and therefore, do not lend themselves to be cached in their entirety. Given that caches have finite disk space, it is not feasible to statically store more than a few complete SM objects. If there are several simultaneous requests for different SM objects, it is easy to show that the cache will be busy replacing one SM object with another resulting in significant performance degradation.

Accordingly, there exists a need to develop improved techniques to enhance current caching systems to facilitate distribution of streaming multimedia over public networks, such as the Internet.

SUMMARY OF THE INVENTION

The present invention discloses a method and apparatus for enhancing existing caching systems to better support streaming multimedia (SM) over the Internet and other public network systems. Illustrative embodiments of the present invention present a novel architecture and method for supporting high quality live and on-demand streaming multimedia on a public network system, such as the Internet. By using helper servers (HS), also referred to as helpers, which operate as caching and streaming agents inside the network, existing caching techniques are enhanced to better support streaming media over the Internet. The helpers serve to implement several methods specifically designed to support streaming media, including proxy caching, client request aggregation which describes the use of memory and disk resources at the helpers, and data transfer rate control to reduce start-up latency.

The invention advantageously reduces server and network loads by employing the above methods to overcome arrival time and range heterogeneity in client requests thereby improving the quality perceived by end users making requests for SM objects.

BRIEF DESCRIPTION OF THE DRAWINGS

The foregoing features of the present invention will become more readily apparent and may be understood by referring to the following detailed description of an illustrative embodiment of the present invention, taken in conjunction with the accompanying drawings, where:

FIG. 10b is a physical view of producer/consumer events of FIG. 10a.

DETAILED DESCRIPTION OF THE PREFERRED EMBODIMENTS

This application is related to co-pending U.S. patent application, Ser. No. 09/538.351, filed on Mar. 29, 2000 by Katherine Guo, Markus Hofman, Paul Snajoy and Hui Zhang having a common assignee; the contents of which are incorporated herein by reference.

To facilitate an understanding of illustrative embodiments of the present invention, it is advantageous to first consider the network operating environment of the present invention, as well as a selection of definitions relating to system architecture and operation.

Illustrative embodiments of the present inventive architectures, systems, and methods described herein focus on data streaming in global, worldwide networks, such as the Internet. Those skilled in the art will recognize, however, that the present architectures, systems, and methods will be applicable to a wide variety of data networks and applications. The following terms and definitions are used in the present disclosure.

Cache: a region on the computer disk that holds a subset of a larger collection of data.

Streaming multimedia object (SM object): a type of data whose transmission has temporal characteristics such that the data may become useless unless the transmission rate is regulated in accordance with predetermined criteria (e.g., audio and video files). Transmission can start at any point within the object and can be terminated by the receiver at any time.

Helper Server (HS): An HS, also referred to as a helper, is one of a plurality of servers in the network that provide certain value-added services. For example, an HS can provide caching services and/or prefetching services. HSs selectively cooperate and communicate streaming SM objects (or segments of such objects) between and among each other and between content providers and clients. That is, HSs understand an object's transmission requirements and can behave, in some respects, like a content provider.

Data stream: a data stream transmits segments of an SM object from one source to one or more multiple receiving hosts. The source might be the sender (i.e., the content provider) or an HS. Receiving hosts could be HSs or receivers (i.e., clients).

Figure 1:
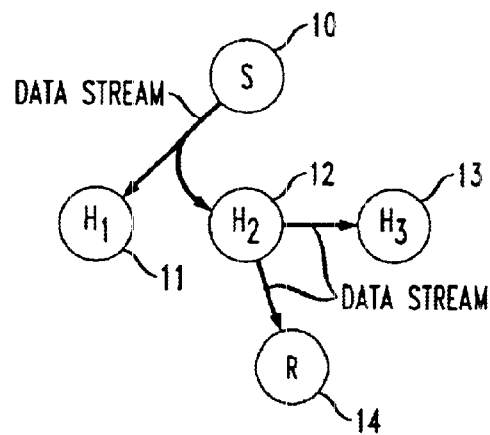
FIG. 1 is an illustration of a network system which includes HSs used in accordance with the present invention.

FIG. 1 illustrates various elements of the terms defined above. Specifically, FIG. 1 shows an illustrative source 10 delivering a data stream directly to each of the helpers H1 11 and H2 12. Helper H2 12 is further shown delivering a data stream to each of the helper H3 13 and receiver R14. In general, the data stream from helper H2 12 to helper H3 13 need not be the same as that arriving at receiver R 14, but in this example the data stream from helper H2 12 to helper H3 13 is illustratively part or all of the same SM object transmitted by the data stream arriving at receiver R 14.

Streaming architectures in accordance with illustrative embodiments of the present invention support techniques to enhance caches to support streaming multimedia over a public network system, such as the Internet. While caching is the traditional approach for improving scalability, it fails to scale in terms of object size and number of supported streams for streaming multimedia objects. In particular, existing solutions for streaming multimedia on the Internet have several shortcomings because these solutions use a separate unicast stream for each request, thus requiring a stream to travel from the server to the client across the Internet for every request.

To overcome these drawbacks and to further enhance the ability of existing caching systems to properly scale in terms of object size and number of supported streams, illustrative embodiments of the present invention advantageously combine three methods which are implemented via a novel system architecture to enhance existing caching systems. The methods are: (1) proxy caching to reduce signaling costs, (2) client request aggregation which describes the use of memory and disk resources at the helpers, and (3) data transfer rate control to reduce start-up latency.

Figure 2:
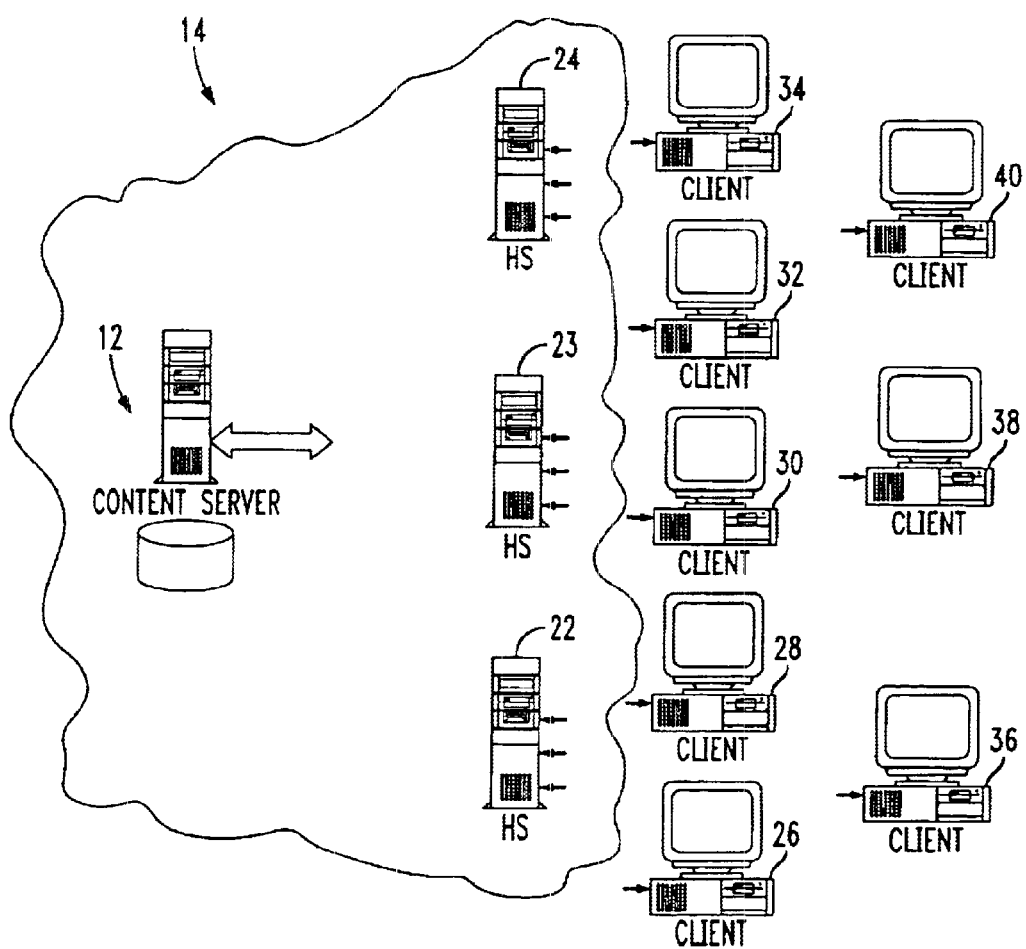
FIG. 2 is an illustration of a network system constructed according to one implementation of the invention.

An exemplary arrangement of using the invention is shown in FIG. 2 which illustrates a public network system (PNS) 14. FIG. 2 further includes a server computer, as represented by content server 12, which stores and serves content over the network 14. The illustrative network 14 is a high-speed, high-bandwidth interactive distribution network, and can be representative of the Internet. The content server 12 serves content in the form of text, audio, video, graphic images, and other multimedia data. In the Internet context, the content servers might represent Web sites which serve or multicast content in the form of hypermedia documents (e.g., Web pages) to "client" computers, as represented by client computers 26–40. The network further includes HSs 22–24. Each HS 22–24 is configured as a conventional server having processing capabilities, including a CPU (not shown) and storage. HSs 22–24 cache Internet resources, such as those requested by client computers 26–40 that have been downloaded from the content server 12 to allow localized serving of those resources. The interaction and cooperation of the above entities are further described below.

SM objects differ from static objects, such as HTML pages or Images, in that each SM object stream has an associated starting playback time and an ending playback time. Thus, when an SM object request arrives at a cache, the request will most likely result in a partial hit in the sense that one part of the requested SM object will typically be stored in the local cache, while the remainder of the SM object will be stored in part at the various HSs 22–24 throughout the network. This is different from conventional web caching where entire objects are stored in a local cache. Given that an HS will typically store only a portion of an SM object, upon receiving a request for an SM object from a client, the HS is required to retrieve the non-stored portions of the SM object from the other HSs in the network 22–24. This practice has the effect of increasing signaling costs and also increases the probability of losing synchronization. Therefore, at a given HS, it is preferable to cache successive segments rather than cache a sequence of segments with multiple gaps in it. This is achieved by prefix caching, where segments of an SM object are ejected from the end by replacing the last segment first. In prefix caching, the last access time of each SM object stored in the local cache is recorded, and when space is required on the local cache to store another SM object, the least recently used SM object is replaced from its end.

Client Request Aggregation

A client request for a SM object can be served from the memory of the HS to which the request was made, the disk of any of the HSs 22–24 in the network, the content server 12, or combinations of each. An objective of the present invention is to reduce latency by reducing the number of requests sent to the content server 12 by servicing as many requests for the same SM object from it own memory and/or disk, thereby reducing server load and network load. This objective is achieved in accordance with a strategy referred to herein as client request aggregation which is implemented in a preferred embodiment by a buffering scheme to be described below.

In accordance with the teachings of the present invention, the buffering scheme for implementing client request aggregation utilizes ring buffers in the memory of the HS. The ring buffers represent a type of short term storage to service multiple requests for the same object which occur within a certain time range. The allocation of ring buffers is advantageous in that multiple requests may be serviced from a single stream from the server thereby reducing latency and network congestion. That is, ring buffers are allocated in anticipation of other clients requesting the same SM object from an HS within a certain time range.

The time range within which multiple requests may be serviced by the same ring buffer is referred to as the buffer temporal distance. To better understand buffer temporal distance, the more global generic concept of temporal distance is first defined in the context of heterogeneity. Requests for SM objects are heterogeneous in nature. In particular, heterogeneity can appear in three forms: media object heterogeneity, arrival time heterogeneity, and range heterogeneity. Media object heterogeneity describes the situation of different clients 26–40 making requests for different SM objects. Media object heterogeneity, is not relevant to the present discussion and is not described in detail herein. Arrival time heterogeneity describes requests for the same SM object arriving at an HS 22–24 at different times, and range heterogeneity describes that each request from a client 26–40 for a SM object has an associated requested playback range (i.e., a starting and ending time). Typically, the starting time for an SM object is the beginning of the SM object. However, a request may be received with starting times other than the beginning of an object, for example, VCR operations involving rewind and fast forward.

Figure 3:
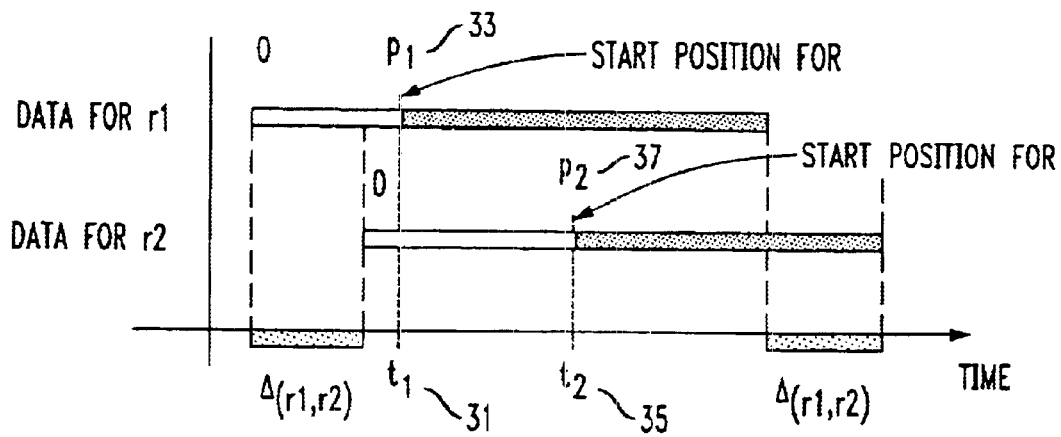
FIG. 3 is an illustration for describing arrival time heterogeneity and range heterogeneity.

FIG. 3 is an exemplary illustration which describes temporal distance as a function of arrival time heterogeneity and range heterogeneity. Consider two requests for the same media object, $r_1$ and $r_2$ where $r_1$ represents a request for an SM object at time $t_1$ (31), with a requested starting position $p_1$ (33) seconds from the beginning of the object, and an ending time equal to the end of the SM object. Further, $r_2$ represents a request for the same SM object at time $t_2$ (35), with a requested starting position $p_2$ (37) seconds from the beginning of the object to the end of the object. The temporal distance is computed as:

$$\Delta(r_1,r_2)=(t_2-p_2)-(t_1-p_1)=(t_2-t_1)-(p_2-p_1) \quad (1)$$

Equation (1) illustrates that temporal distance is a function of both the arrival time heterogeneity $(t_2-t_1)$, and the range heterogeneity $(p_2-p_1)$.

Figure 4:
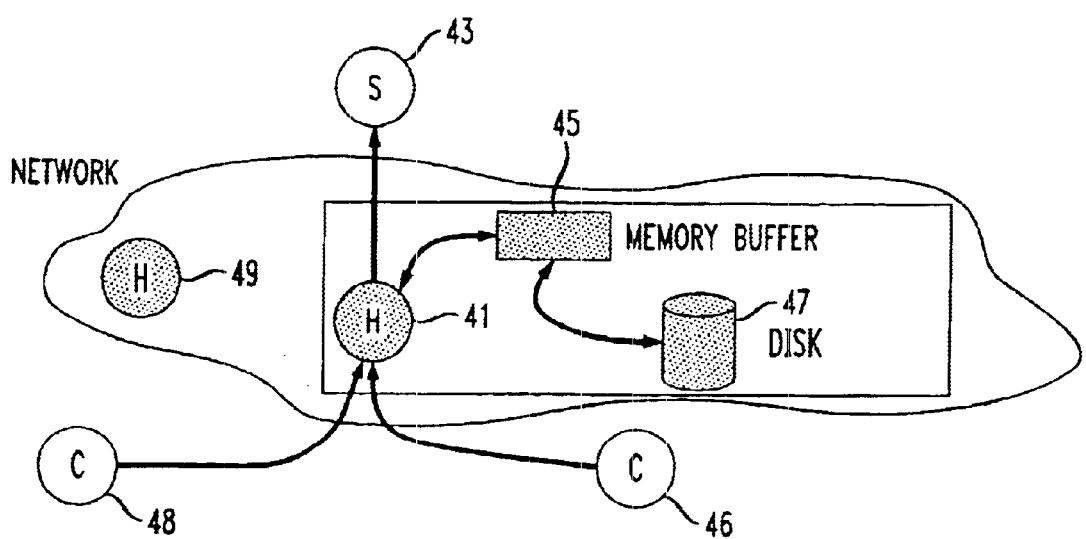
FIG. 4 is an illustration of a network system for describing the allocation of a ring buffer in accordance with the present invention.

Having described temporal distance, the method of allocating a ring buffer in the memory of an HS is now described with reference to FIG. 4. FIG. 4 illustrates a portion of a network including an HS 41 having an associated memory buffer 45 and a disk unit 47. The network of FIG. 4 also includes a second HS 49, a content server 43, and two clients $C_1$ 46 and $C_2$ 48. Whenever a request for an SM object is received at an HS 41 for the first time, the HS 41 forwards the request to the content server S 43. Upon receipt of the request, the content server S 43 starts streaming the requested SM object to the HS 41. In this particular example, the HS 49 does not have the requested SM object stored locally. In general, when a ring buffer is first allocated at an HS, such as HS 41, it is filled with data from one or more of the following data sources: preferably H 41 if the data is available there, otherwise H 49, or the content server S 43. The HS 41 stores the received SM object in its memory 45 and disk 47, and at the same time streams data to the client making the request, and allocates a ring buffer in memory (not shown in FIG. 4) having a buffer temporal distance $\Delta_b$ seconds of data. That is, the ring buffer B stores a moving window of $\Delta_b$ seconds of the SM object stream, where $\Delta_b$ is a measure of the buffer size in time units.

Figure 5A:
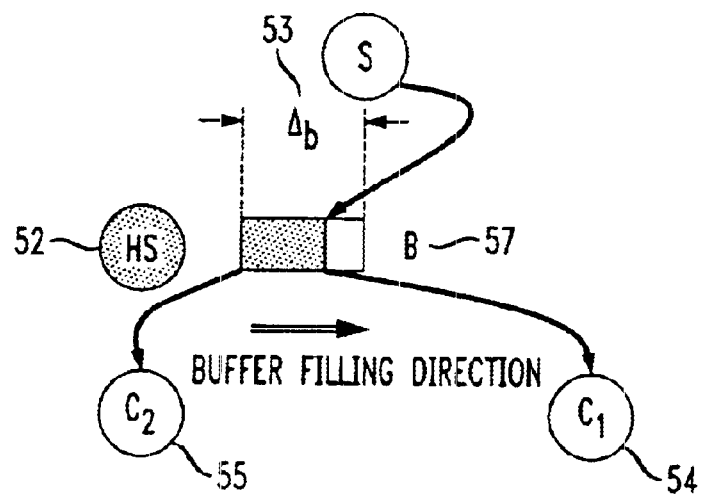
FIGS. 5a and 5b is a network configuration and associated timing diagram which illustrates the allocation of a single ring buffer in the local memory of helper to service multiple requests in accordance with the present invention.
Figure 5B:
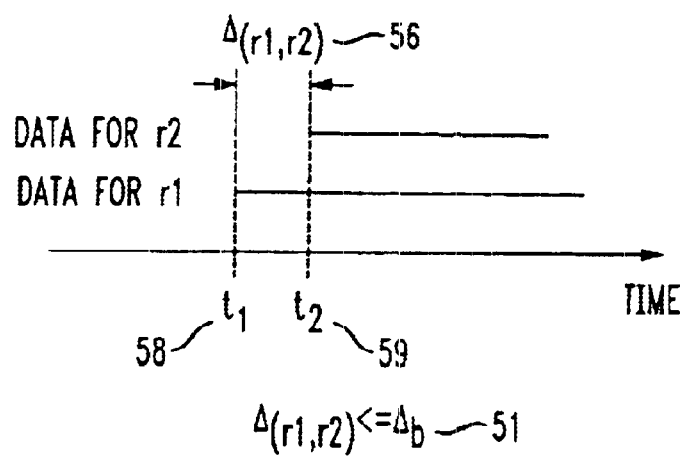
Figure 6A:
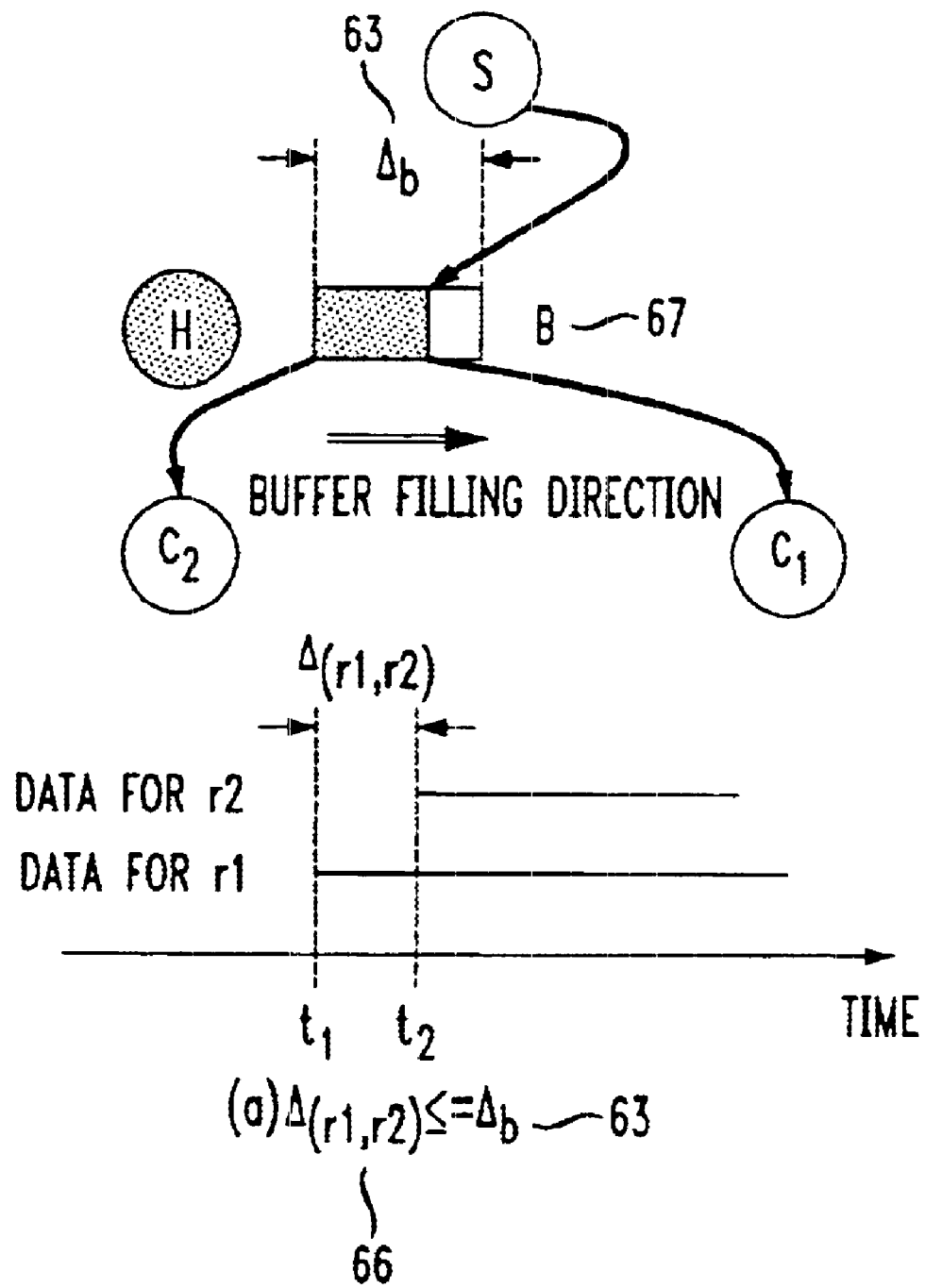
FIGS. 6a and 6b is a network configuration and associated timing diagram which illustrates the allocation of a second ring buffer in the local memory of a helper in accordance with the present invention.
Figure 6B:
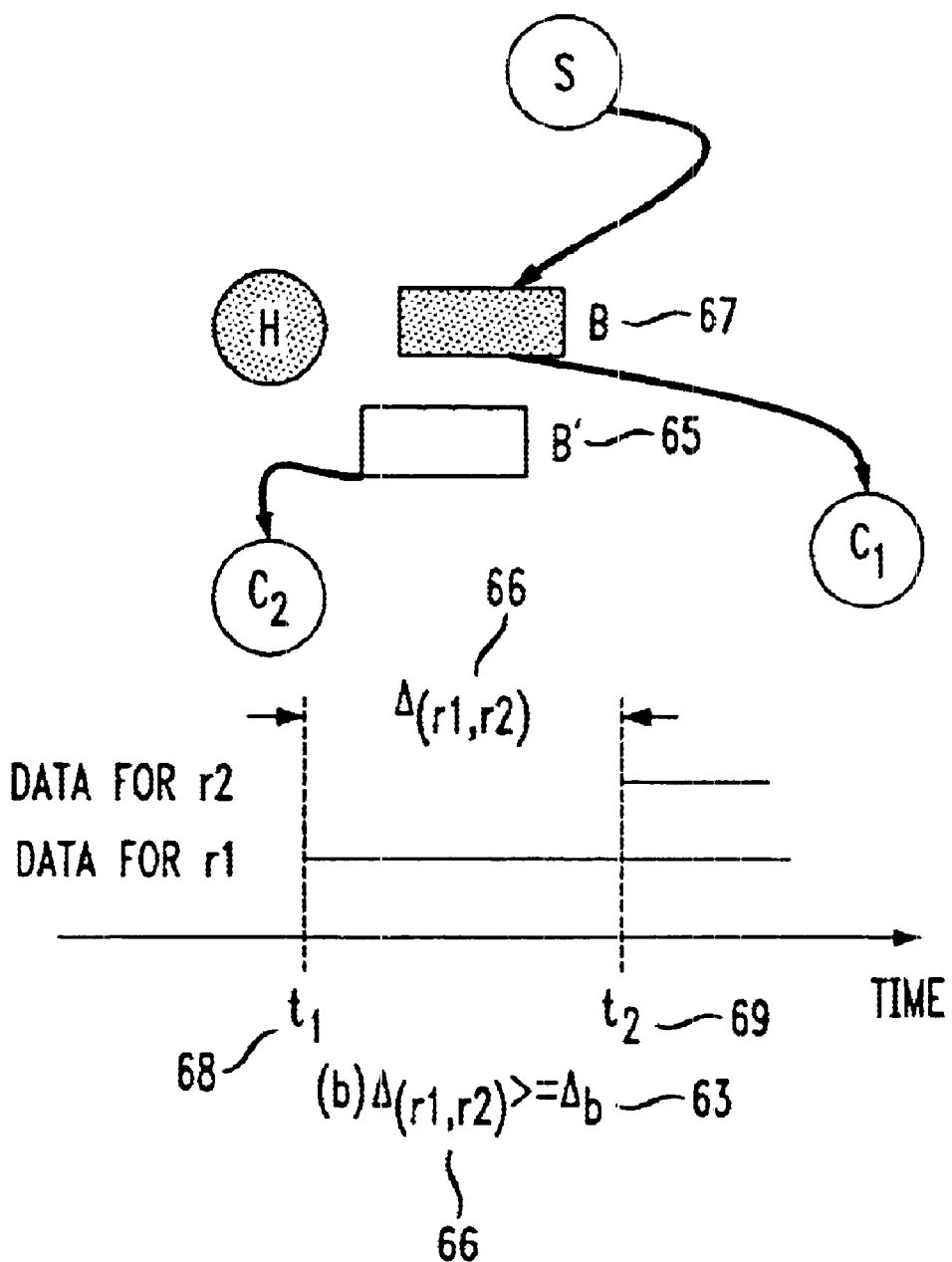

Once a ring buffer is allocated in the memory of an HS it is available to service additional requests for that SM object which occur within a time interval defined by the buffer temporal distance, $\Delta_b$. FIGS. 5a and 5b illustrate the case where an initial client request, $r_1$, and a subsequent client request, $r_2$ are serviceable from an allocated ring buffer. FIGS. 6a and 6b illustrate the case where the subsequent client request, $r_2$, is not serviceable from the ring buffer allocated to service request $r_1$.

Referring first to FIGS. 5a and 5b which illustrate the first case of servicing requests $r_1$ and $r_2$ from the same ring buffer B 57. The first request, r1, is initiated by client C1 54 at time t1 (58). At some later time $t_2$ (59), client $C_2$ 55 makes a request, $r_2$, at time $t_2$ (59) to the HS 52 for the same SM object, also from the beginning of the stream. FIG. 5b illustrates the temporal distance of the two requests, $\Delta(r_1,r_2)$ 56. In the illustrative example of FIG. 5b, the temporal distance $\Delta(r_1,r_2)$ 56, as defined by equation (1), does not exceed the buffer temporal distance, $\Delta_b$ 53 (i.e., buffer size) as shown in FIG. 5a and described by equation (2).

$$\Delta(r_1,r_2)=t_2-t_1 \leq \Delta_b \quad (2)$$

Satisfying the inequality defined by equation 2 allows the subsequently received request, $r_2$, to be serviced from the allocated ring buffer B 57.

It is noted that, the first ring buffer 57 is capable of servicing any number of requests for the stored SM object which may occur within the time interval defined by the buffer temporal distance, $\Delta_b$. As such, the ring buffer 57 operates as a type of short term cache which stores a portion of an SM object for a fixed time interval. It is also convenient to view the ring buffer 57 as a sliding window in the sense that portions of an SM object are initially cached in the ring buffer 57 and then deleted to store successive portions of the SM object. This sliding window process is described in greater detail with reference to FIGS. 10a and 10b.

Referring now to FIG. 6b which illustrate the second case where a subsequent request is not serviceable from an allocated ring buffer B 67. FIG. 6b illustrates the allocation of a second ring buffer B=65 to service request $r_2$. The allocation of a second ring buffer is required in this example by considering the request times associated with the first and second request. In particular, FIG. 6b illustrates request times $t_1$ (68) and $t_2$ (69) for requests $r_1$ and $r_2$, respectively. In this example the temporal distance $\Delta(r_1,r_2)$ (66), as defined by equation (1), exceeds the buffer temporal distance, $\Delta_b$ 63 (i.e., buffer size). Accordingly, the subsequently received request, $r_2$, is not serviceable from the previously allocated ring buffer B 67. In this case, a second ring buffer B=65 is allocated to service the second request, $r_2$. In this case, the temporal distance the buffer is exceeded, as described by equation (3):

$$\Delta(r_1,r_2)=t_2-t_1 > \Delta_b \quad (3)$$

When the inequality defined by equation (3) is true, it indicates that a subsequently received request (e.g., $r_2$) is not serviceable by a first allocated ring buffer B 67, as the request is received at a point in time where the beginning of the SM object stream is no longer available in the previously allocated buffer B 67. In this case, the second ring buffer B=65, is allocated with a buffer temporal distance of $\Delta_b$ seconds, and is filled with data from the beginning of the SM object stream.

It is further noted, that whenever a ring buffer is allocated in memory in response to a client request, as the ring buffer is filled, the data is simultaneously streamed to the requesting client. It is also further noted, that in general, the number of ring buffers which may be allocated is practically limited by the size of the local memory which is small in comparison to disk space which is also limited at a HS. Because the ring buffer represents a limited resource, when client requests cannot be fully satisfied through the deployment of ring buffers, an HS can serve a client's request from any combination of sources including: the memory ring buffer, cache on the disk, the memory or disk of other HSs in the network, and the content server.

Data Transfer Rate Control

As described above client request aggregation represents one approach for enhancing existing caching systems to reduce latency. A second approach for reducing latency is data transfer rate control which is generally defined as the rate at which data streams are transmitted between clients, HSs and content servers in the network.

Subsequent to receiving a client request for an SM object at a content server, the content server responds by sending out data packets at a playback rate of r bytes/second. Each client in the network maintains a playout buffer of K seconds, and does not start playing an SM object until its playout buffer is full. The use of playout buffers to absorb jitter is well known in the art. When a client request is served from a HS at a rate "r" bytes/second, the playout buffer can be filled faster from the HS than from the content server due to the smaller network distance and reduced network congestion.

Figure 7A:
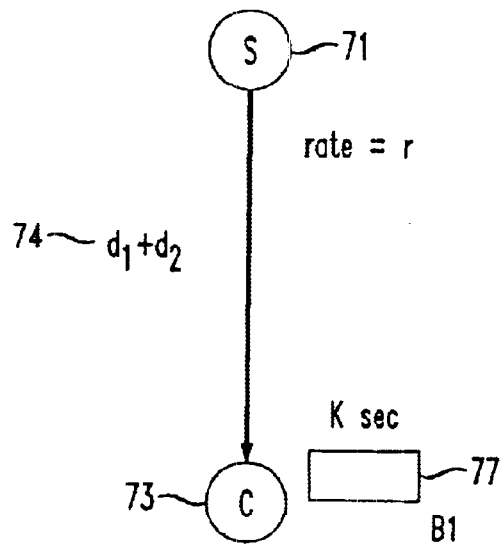
FIG. 7a is an illustration of data rate control parameters for a network including a server in direct communication with a client.
Figure 7B:
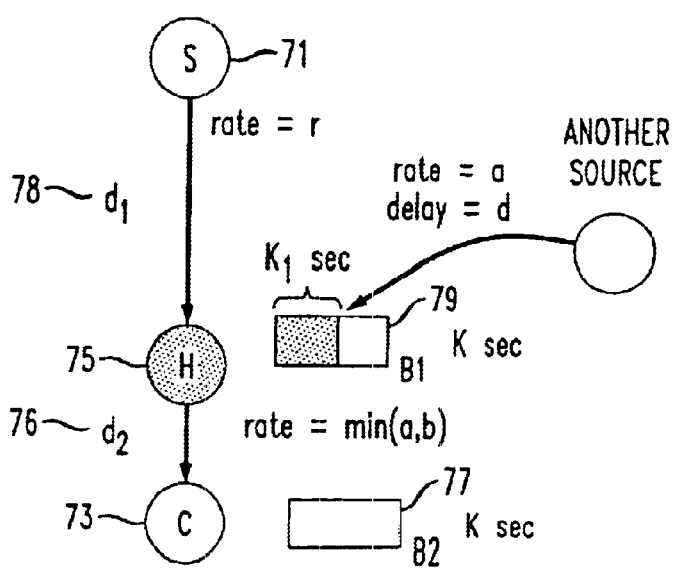
FIG. 7b is an illustration of data rate control parameters for a network including a server, client, and a helper.

FIGS. 7a and 7b illustrate two network configurations which describe data transfer rate control. In the first network configuration, illustrated in FIG. 7a, no intermediary HS is employed.

Referring first to FIG. 7b, which illustrates a content server S 71 streaming data to an HS 75 having an associated buffer B1 79, whereby the HS 75 in turn streams the received data to a client C 73. Client C 73 has an associated playout buffer B2 77 of size K sec. In this situation, the delay between the content server 71 and the helper 75 is assumed to be $d_1$ (78), and the delay between the helper 75 and the client C 73 is assumed to be $d_2$ (76).

Referring now to FIG. 7a, the delay between the content server S 71 and the client C 73 is assumed to be $d_1+d_2$ (74) when no intermediary HS is present. It is further assumed that in FIGS. 7a and 7b, the content server S 71 sends streaming data at a rate of "r" bytes/sec to the client C 73. The start-up latency is calculated as $$L_0=2(d_1+d_2)+K \quad (4)$$

Equation (4) is comprised of two parts: a first part, $2(d_1+d_2)$, which describes the latency associated with the round trip time of the initial request from client C 73 to content server S 71 and back, and the second part describes the time required to fill the initial client playout buffer B2 77 with the requested data.

Referring again to FIG. 7b, which includes the intermediary HS 75. It is assumed that the HS 75 initially has $K_1$ seconds of data in its buffer B1 79 where $0 \leq K_1 \leq K$. The client's C 73 request takes $d_2$ seconds to arrive at the HS 75. Upon receiving the request at the HS 75, two processes are started concurrently. A first process is to download the existing $K_1$ seconds of data stored in the playout buffer B1 79 associated with the HS 75 to the client C 73 as fast as the bandwidth allows. Assuming the average rate of transfer between the HS 75 and the client C 73 is "b" bytes/second, the first process takes $(K_1*r)/b$ seconds to download $K_1$ seconds of data from the playout buffer B1 79.

The second concurrent process is for the HS 75 to request $K-K_1$ seconds of data from either its local disk, or another HS, or the content server S 71 so that the client's C 73 playout buffer B2 77 may be completely filled. Let "d" generally designate the one way latency between these sources and the HS 75, and let "a" designate the bandwidth from these sources to the HS 75. It therefore takes 2d seconds for the first byte of data to arrive at the HS 75.

Only after both the first and second processes conclude, where process one represents the download of the first K, seconds of data to the client, and process two represents the retrieval of the remaining $K-K_1$ seconds of data, can the HS 75 start to send the remaining $K-K_1$ seconds of data to the client 73. The time for both the first and second processes to conclude is calculated as:

$$\max[(K_1 * r)/b, 2d] \quad (5)$$

Upon completion of processes one and two, described above, the buffer B2 79 at the HS 75 is filled at a rate "a" and drained with an average rate of "b" with the remaining $K-K_1$ seconds of data. In order to avoid buffer underflow, the draining rate for the buffer B2 79 is set to be the minimum of the fill and drain rates, min(a,b). Therefore, the time it takes for the remaining $K-K_1$ seconds of data to be downloaded to the client 73 is computed as $$d_2 + [(K-K_1) * r]/\min(a,b) \quad (6)$$

Equation (6) is made up of two parts: the first part represents the one-way latency, $d_2$, associated with the time required for the first byte to be transmitted from the HS 75 to the client C 73. The second part of equation (6) represents the time required to send $(K-K_1)*r$ bytes of data at a minimum playout buffer draining rate of min(a,b).

The resulting start-up latency is then computed from equations (5) and (6) as $$L_1 = (d_2 + \max[(K_1 * r)/b, 2d]) + (d_2 + [(K-K_1) * r]/\min(a,b)) \quad (7)$$

The start-up latency, defined by equation (7) is composed of two terms: a first term which represents the maximum time that the HS 75 must wait before it can start sending the remaining $K-K_1$ seconds of data to the client (i.e., $d_2 + \max[(K_1 * r)/b, 2d]$), and a second term which defines the time it takes for the remaining $K-K_1$ seconds of data to be downloaded to the client 73 (i.e., $d_2 + [(K-K_1)*r]/\min(a,b)$).

Consider the situation where a HS 75 does not have any data initially cached in its out buffer B1 79 (i.e., $K_1=0$), and it is further determined that the content server S is the best choice to obtain the requested SM object (i.e., $d=d_1$). Further assume that the fill rate is a=r, and therefore the drain rate is represented as min(a,b)=min(r,b)=r. Given these assumptions, the start-up latency is computed from equation (7) as $$L_1 = 2d_1 + 2d_2 + K \quad (8)$$

$L_1$ is the same as Lo as shown in equation (4), which is the start-up latency for the configuration without an HS.

Figure 8A:
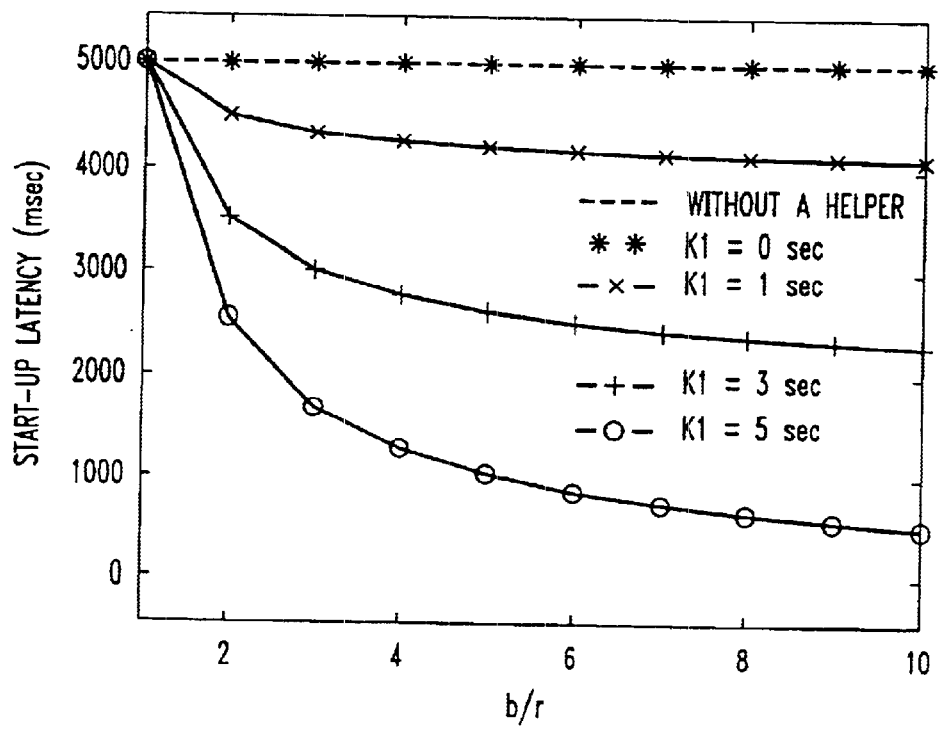
FIGS. 8a and 8b are graphs which illustrate start-up latency with and without an HS in the network.
Figure 8B:
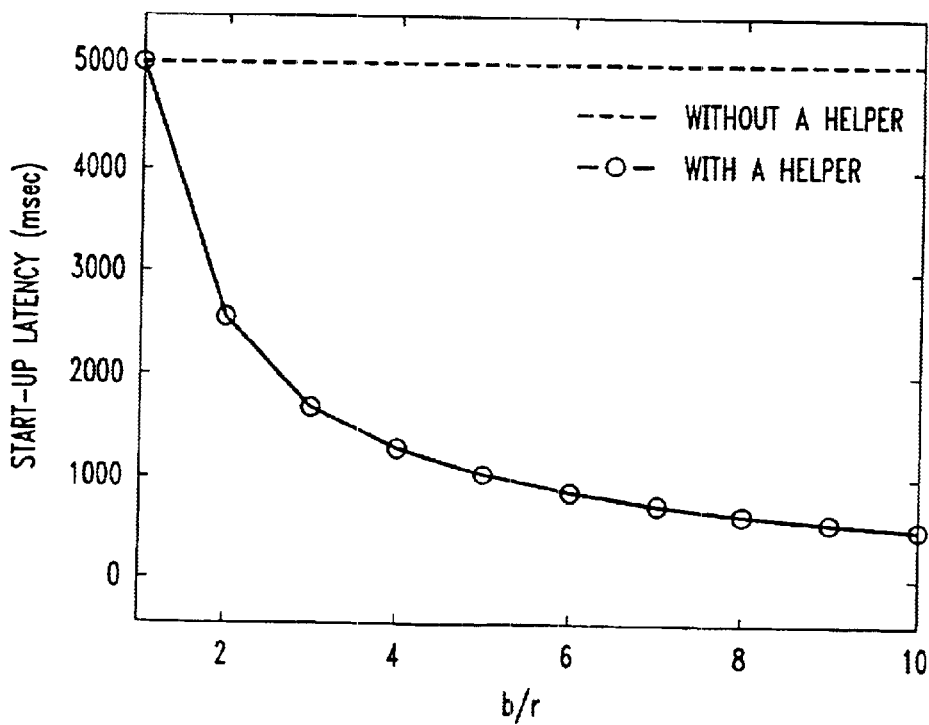

The only parameter under the control of the HS to improve start-up latency is the data transfer rate from the HS to the client, "b". FIGS. 8a and 8b are illustrations of graphs comparing the variation in the start-up latency when an HS is employed, shown by the solid curve, and the start-up latency without a HS (i.e., the dotted line). The following assumptions are made in each graph: a=r, $d_1$=10 ms, $d_2$=1 ms, K=5 s(i.e., K is capable of storing 5 s). The ratio between the HS data transfer rate, "b", and the content server's playback rate "r" is varied between 1 and 10. The amount of cached data $K_1$ is varied between 0 and 5 seconds. In FIG. 8a, the HS requests $K-K_1$ seconds of data from the content server. It is shown in FIG. 8a that the start-up latency decreases as the ratio b/r increases where "r" is the fixed playback rate. Therefore, it is shown that the start-up latency can be decreased with increasing values of "b".

In contrast with FIG. 8a where the remaining data resides at the content server, FIG. 8b describes the situation where the remaining $K-K_1$ seconds of data resides at the HS. In this case, d=0, where d represents the one-way latency between various sources and the HS, and network bandwidth is of no consideration, only the disk bandwidth is applicable RTP/RTSP Embodiment The present invention may be implemented to accommodate control and data protocols well known in the art. In a preferred embodiment, the present invention is implemented using the real-time streaming protocol (RTSP) as the control setup protocol and the real-time protocol (RTP) as the transport protocol. RTSP is a proposed protocol for standardizing streaming media on the Internet and is used as one of the streaming protocol by Real Networks (TM). RTSP utilizes the Internet standard protocols, including: UDP, TCP/IP, and IP Multicast, and operates with RTP.

Figure 9:
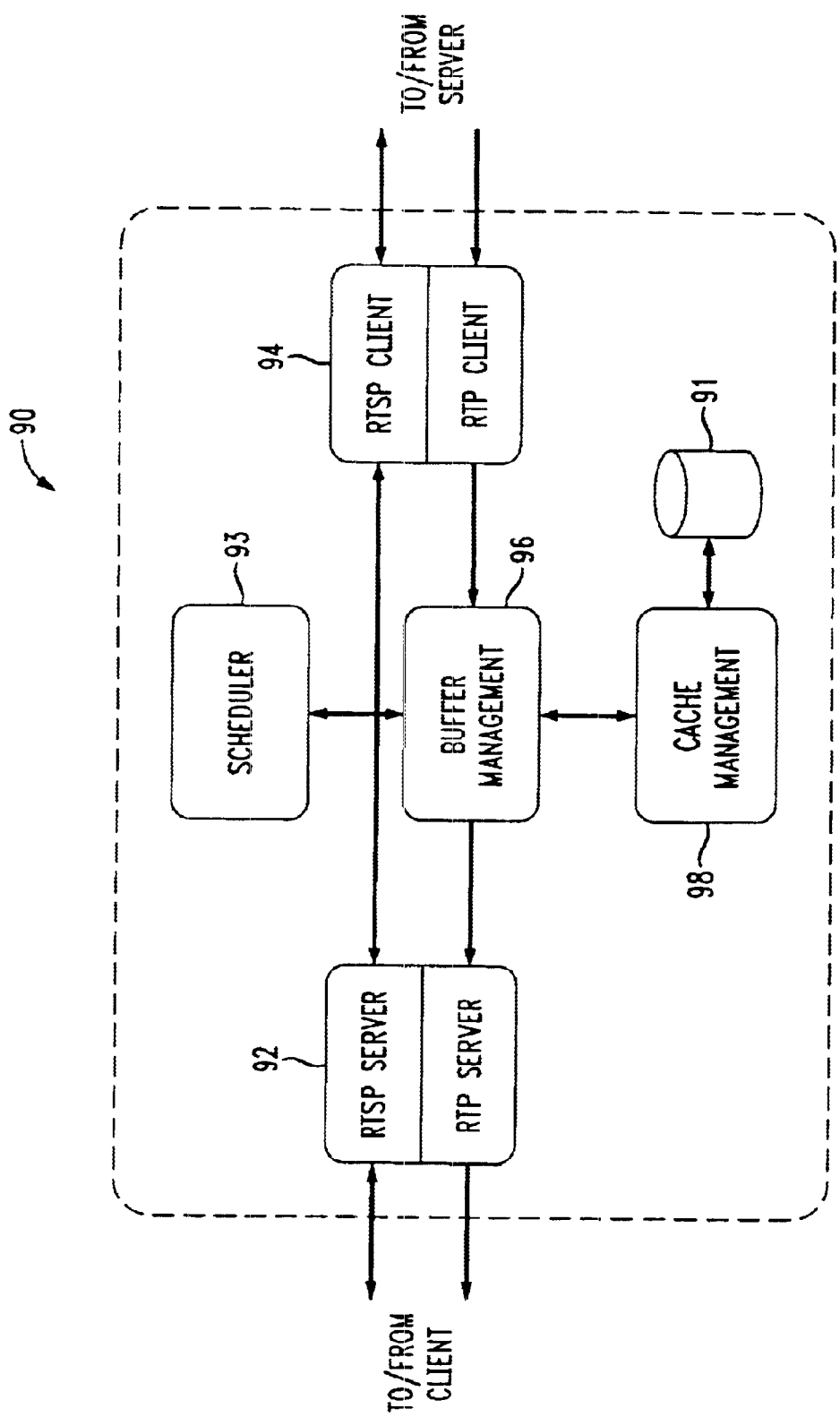
FIG. 9 is a schematic block diagram of the functional components of a helper in the network system utilizing the RTP protocol.

Turning now to FIG. 9, there is shown a high level block diagram of the main modules which make up a HS 90 in the network implementing the RTSP and RTP protocols. The HS 90 includes an RTSP/RTP server module 92, an RTSP/RTP client module 94, a buffer management module 96, a cache management module 98, and a scheduler 93.

The RTSP/RTP server module 92 performs a number of functions including: receiving and processing RTSP requests from clients, interacting with the RTSP/RTP client module 94 to forward the client requests to the content server S after appropriate header translation, and streaming data to clients using the RTP protocol. The RTSP/RTP client module 94 contacts media servers or other HSs 22–24 across the network to fetch data to satisfy client requests. The buffer management module 96 manages the available memory in the form of a pool of buffers, each buffer being associated with an SM object identified by a URL and a time range. As requests are received at the HS, the buffer management module 96 attaches each new incoming SM object request to an existing buffer in the buffer pool if one is available. In the case all existing buffers in the buffer pool are currently associated with an SM object, the buffer management module 96 allocates a new buffer for the incoming SM object. The buffer management module 96 also manages the RTSP/RTP client module 94 to fetch data that is not available in local disk cache, and interacts with the cache management module 98 when recording data for an SM object onto the cache and reading data for an SM object from the cache. The cache management module 98 maps URLs received as a parameter along with an SM object request from a client to local filenames and manages the disk space allocated for caching by implementing a cache replacement policy (i.e., how segments of SM objects are added/deleted).

The buffer management module 96 is the central multiplexing-demultiplexing point of the HS 90. This module serves as the data source for the RTSP/RTP server module 92 and as the data sink for the RTSP/RTP client module 94. This module also interacts with the cache management module 98 for recording data onto the cache 91 and reading data from the cache 91.

The buffer management module 96 manages a pool of buffers in the main memory of an HS. Each buffer contains data to service a client request for an SM object having a specified time range (i.e., starting time, ending time). The buffer size is specified in time units. At any instant, there could exist multiple buffers in the buffer pool containing data for the same SM object, where each buffer corresponds to a different specified time range in response to randomly received requests from multiple clients in the network, where each request has a specified time range. The buffer pool size is constrained by the size of the memory.

The scheduler module 93 manages the global queue of events, where each event is scheduled for execution at a certain time. Example events include data producer and consumer events, and garbage collector events to be discussed below.

Figure 10A:
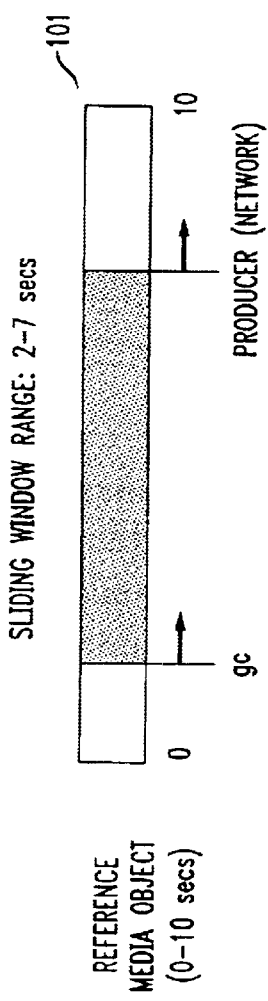
FIG. 10a is an illustration of a logical view of producer/consumer events acting upon a ring buffer according to the present invention.

FIG. 10a is an illustration of a logical view of the processes of data insertion and deletion associated with a representative memory buffer 101 created at a HS to service an SM object request received from a client in the network. FIG. 10a illustrates a buffer allocated with a size of 10 seconds, i.e., [0 s,10 s]. In one embodiment, a minimum amount of data must be present in the buffer at all times which is equivalent to the buffer temporal distance. For the illustrative example of FIG. 10a, this minimum amount of data is shown to be from 2 to 7 seconds. This minimum amount of data may be viewed as a sliding or moving window in the sense that as incrementally higher ordered time packets are inserted into the buffer, the right edge of the sliding window moves to the right, and as the garbage collector function removes lower ordered time packets from the buffer the left edge also moves to the right.

Figure 10B:
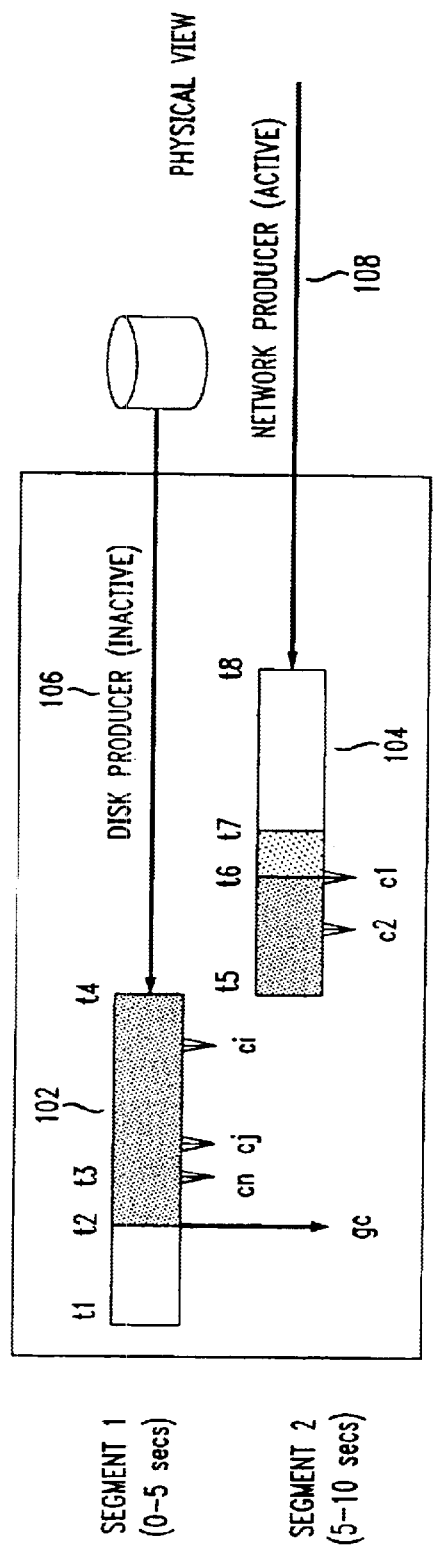

FIG. 10b is an embodiment of the logical view of buffer data insertion and deletion of FIG. 10a. As previously described, a ring buffer may be made up of multiple data segments, where each data segment represents data obtained from a separate data source (e.g., local disk, remote disk). The ring buffer illustrated in FIG. 10b illustrates two data segments: a first data segment, segment 1, whose segment size is defined as $[t_1;t_4]$ 102, and a second data segment, segment 2, whose segment size is defined as $[t_5;t_8]$ 104. In general, data is sourced to a segment of a ring buffer from a producer event. FIG. 10b illustrates two producer events, a disk producer 106 for sourcing data to the first segment 102, and a network producer 108 for sourcing data to the second segment 104.

In addition to the producer events shown, consumer events stream data out of the buffer. FIG. 10b shows n consumers: $c_1, c_2, \ldots, c_n$. Each consumer represents a separate request for the SM object at a particular starting point in the object. In the example of FIG. 10b, the local disk is the producer which sources data to the first segment 102, and the remote server, which could be either the content server and/or the HS is the producer which sources data to the second segment 104 of the ring buffer. Further, $t_1, t_2, \ldots t_8$ represent RTP timestamps of data packets which comprise the SM object in accordance with the RTP protocol. Client requests (i.e., consumers) request a starting point of an SM object by specifying an RTP timestamp associated with the object.

Buffer underflow and overflow problems need to be addressed for each allocated ring buffer. To address buffer underflow and overflow, a list of consumers (e.g., $c_1, c_2, \ldots, c_n$.) for each buffer is sorted in accordance with the position of the next packet to be streamed from the buffer. To handle buffer underflow, a producer event (i.e., data source) must occur ahead of the first consumer $c_1$, and to handle buffer overflow the garbage collector, gc, which is an event which frees RTP packets from the buffer no longer needed by any of the consumers, must occur behind the last consumer, $c_n$. Each buffer is associated with a garbage collection event, gc, which is first created when the buffer is filled with data and frees the RTP packets from the buffer after they have been forwarded from the buffer by the last consumer. In the example of FIG. 10b that the garbage collector gc has already freed RTP packets in the range $[t_1,t_2]$ from the buffer. It should be noted that the first and last consumer of a buffer are not stationary but rather may change with time due to range, rate, and arrival time heterogeneity across consumers using the buffer.

While the invention is susceptible to various modifications and alternative forms, specific embodiments thereof have been shown by way of example in the drawings and have been described in detail. It should be understood, however, that it is not intended to limit the invention to the particular forms disclosed, but on the contrary, the intention is to cover all modifications, equivalents and alternatives falling within the spirit and scope of the invention as defined by the appended claims.

What is claimed is:

1. In a network having a content server which hosts a plurality of streaming multimedia (SM) objects which comprise a plurality of time-ordered packets for distribution over said network through a plurality of helper servers (HS) to a plurality of clients, a method of reducing latency associated with distributing said plurality of SM objects from said content server and said plurality of helper servers HSs to said plurality of clients, said method comprising:

servicing a first request received from one of said plurality of clients, including a requested starting position of said SM object, for one of said plurality of SM objects by allocating a first ring buffer in a memory associated with said one of said plurality of HSs for storing data representing a first portion of one of said plurality of SM objects, wherein said first portion includes a packet having an associated time-stamp approximately equal to the requested starting position;

maintaining the first ring buffer in the memory as a sliding window by replacing stored data with data representing successive portions of said one of said plurality of SM objects; and allocating a second ring buffer to service a further request for said one of said plurality of SM objects received at said one of said plurality of helper servers, if it is determined that said further request cannot be serviced from said first ring buffer, otherwise servicing said further request from said first ring buffer.

2. The method according to claim 1, wherein said further request is determined not to be serviceable from said first ring buffer by performing the following steps:

calculating a temporal distance between said first request and said further request;

comparing the calculated temporal distance with a buffer temporal distance associated with said first ring buffer; and determining that the calculated temporal distance is greater than the buffer temporal distance.

3. The method according to claim 2, wherein said temporal distance is calculated as:

$$\Delta(r_1,r_2)=(t_2-p_2)-(t_1-p_1)-(p_2-p_1)$$

where $r_1$ is said first request for said one of said plurality of SM objects;

$r_2$ is said further request for said one of said plurality of SM objects;

$t_1$ is the request time associated with the first request;

$t_2$ is a request time associated with the further request;

$P_1$ is a requested starting position of said one of said plurality of SM objects, in seconds, associated with the first request; and $P_2$ is a requested starting position of said one of said plurality of SM objects, in seconds, associated with the further request.

4. The method according to claim 2, wherein the temporal distance is a function of the request time and the requested starting position for said one of said plurality of SM objects.

5. The method according to claim 1, wherein said further request is determined not to be serviceable from said first ring buffer by determining that said requested starting time is not contained in a range between a largest timestamp associated with a packet stored in the buffer and a smallest time-stamp associated a packet stored in the buffer.

6. The method according to claim 2, wherein the buffer temporal distance is a measure of the allocated buffer size in units of time.

7. The method according to claim 1, wherein said stored data comprises a plurality of data segments, wherein each of said plurality of data segments is sourced from one of said content server and/or said plurality of HSs.

8. The method according to claim 1, wherein a further ring buffer associated with said one of said plurality of SM objects is allocated in the memory, if it is determined that a previously allocated ring buffer associated with said one of said plurality of SM objects cannot service a current request for said one of said plurality of SM objects.

9. The method of claim 8, wherein the number of ring buffers capable of being allocated in memory is dependent upon the size of the memory.

10. The method according to claim 1, further including the step of replacing stored data with data representing successive portions of said one of said plurality of SM objects, wherein said step further comprises the steps of:
   a) determining that said first ring buffer is full;
   b) initiating a garbage collector event including the steps of:
      i) determining that a stored packet having the lowest associated time-stamp is less than the current position associated with a most recently received request and wherein said stored packet having the associated lowest time-stamp value is less than the difference between the stored packet having an associated highest time-stamp value and the buffer temporal distance;
      ii) removing said stored packet from said first ring buffer, if determination step (i) is true;
      iii) repeating steps(i) through (ii), until determination step (i) is no longer true,
      iv) de-initiating said garbage collector event, until it is determined that step (a) is true again and returning to step (b).

11. The method according to claim 1, wherein said first ring buffer is de-allocated from the memory upon removing all stored packets from said first ring buffer.

12. The method according to claim 1, wherein said time-ordered packets are RTP packets.

13. In a network having a content server which hosts streaming multimedia (SM) objects, each of said SM objects comprising a plurality of time-ordered packets for distribution over said network through a plurality of HSs to a plurality of clients, a method of reducing latency associated with distributing said SM objects from said content server and said plurality of helpers (HS) to said plurality of clients, said method comprising:
   receiving a first request for an SM object, including a requested starting position, received from one of said plurality of clients at one of said plurality of HSs;
   allocating a first ring buffer in a memory associated with said one of said plurality of HSs upon receiving said first request;
   retrieving said SM object comprising said plurality of time-ordered packets from at least one of said plurality of HSs including said one of said plurality of HSs and said content server;
   sequentially storing said plurality of time-ordered packets from said retrieved SM object in said first ring buffer by replacing lower time-ordered packets with higher time-ordered packets;
   servicing a second request for said SM object from said first ring buffer, if it is determined that said subsequent request includes a starting request position within a range between a largest timestamp associated with a packet stored in the buffer and a smallest time-stamp associated a packet stored in the buffer; and
   allocating a second ring buffer in the memory, if it is determined at the servicing step that said second request cannot be serviced from said first ring buffer.

14. The method according to claim 13, wherein at said retrieving step, said data is retrieved from said one of said plurality of HSs, if said data is it determined to reside at said one of said plurality of HSs.

15. The method according to claim 14, wherein said method further comprises the steps of, if it is determined a first portion of said requested SM object is not stored at said one of said plurality of HSs:
   forwarding said first request for said SM object from said one of said plurality of HSs to said content server; and
   receiving at least said first portion of said requested SM object at said one of said plurality of HSs from said content server in response to said forwarded first request.

16. A method of reducing latency in a network having a content server which hosts streaming media (SM) objects which comprise a plurality of time-ordered segments for distribution over said network through a plurality of helpers (HSs) to a plurality of clients, said method comprising:
   receiving a request for an SM object from one of said plurality of clients at one of said plurality of helper servers;
   allocating a buffer at one of said plurality of HSs to cache at least a portion of said requested SM object;
   downloading said portion of said requested SM object to said requesting client, while concurrently retrieving a remaining portion of said requested SM object from one of another HS and said content server; and
   adjusting a data transfer rate at said one of said plurality of HSs for transferring data from said one of said plurality of helper servers to said one of said plurality of clients.

17. A network of interconnected helper servers (HSs), each of said interconnected helpers comprising
   means for receiving and processing real-time streaming protocol (RTSP) requests from clients;
   means for forwarding client requests to a content server;
   means for streaming data to a plurality of clients using the real-time (RTP) protocol;
   means for managing available memory in the form of a buffer pool, each buffer in said buffer pool being associated with an SM object identified by a uniform resource locator (URL);
   means for mapping URLs identifying said objects received as a parameter along with an SM object request to local filenames;
   means for managing the disk space allocated for caching by implementing a cache replacement policy;
   means for recording data onto said cache and reading data from said cache; and scheduler means for managing data producer, data consumer, and garbage collector events, wherein said data producer events are events which source at least a portion of said SM object to said one of said plurality of helper servers to be stored in one of said buffers in said buffer pool, said data consumer events are RTSP requests from clients, and garbage collector events are events associated with removing a portion of said SM objects stored in said buffer pool to free the available memory.

* * * * *